United States Patent [19]

Acampora et al.

[11] Patent Number: 4,575,749
[45] Date of Patent: Mar. 11, 1986

[54] COMPONENT COMPANDING IN A MULTIPLEXED COMPONENT SYSTEM

[75] Inventors: Alfonse A. Acampora, Staten Island, N.Y.; Richard M. Bunting, Cranbury, N.J.

[73] Assignee: RCA Corporation, Princeton, N.J.

[21] Appl. No.: 518,087

[22] Filed: Jul. 28, 1983

[51] Int. Cl.$^4$ ............................................. A04N 9/68
[52] U.S. Cl. ........................................ 358/27; 358/315
[58] Field of Search ...................... 358/12, 27, 38, 37, 358/310, 315, 320, 330, 36, 39, 40; 455/72

[56] References Cited

U.S. PATENT DOCUMENTS

| | | | |
|---|---|---|---|
| 3,504,115 | 3/1970 | Suzuki | 455/72 |
| 3,836,707 | 9/1974 | Murahomi | 358/37 |
| 4,335,393 | 6/1982 | Pearson | 358/12 |
| 4,359,756 | 11/1982 | Schneider | 358/27 |
| 4,376,957 | 3/1983 | Dischert et al. | 358/334 |
| 4,396,938 | 8/1983 | Dischert | 358/21 R |
| 4,456,930 | 6/1984 | Hashimoto | 358/320 |
| 4,472,733 | 9/1984 | Bolger | 358/38 |
| 4,510,521 | 4/1985 | Ruprecht | 358/27 |

Primary Examiner—Alan Faber
Attorney, Agent, or Firm—P. J. Rasmussen; P. M. Emanuel; R. G. Coalter

[57] ABSTRACT

A transmitter applies luminance and chroma components of a color television signal to a transmission path, such as a VTR or satellite, in amplitude compressed form. To obtain optimum improvement in S/N ratio, different compression laws for the luminance and chroma components are used. The signals can also be time compressed and sent in TDM form.

9 Claims, 2 Drawing Figures

COMPONENT COMPANDING IN A MULTIPLEXED COMPONENT SYSTEM

BACKGROUND OF THE INVENTION

The present invention relates to companding (compressing and then expanding), and more particularly to companding of video signals.

Recently there is interest in transmitting color video signals in time multiplexed analog component form (MAC) rather than the more conventional composite form. This transmission typically takes place by way of FM in a channel, which can be a video tape recorder (VTR) or a satellite transmission path. Such channels however contain noise, which degrades the quality of the reproduced picture. One way of improving the quality of the picture derived from such a noisy channel is by companding. In companding the amplitude of the video signal at the transmitter or recorder is compressed, thereby raising its average-to-peak ratio, and hence its realtive immunity to noise. At the receiver or playback apparatus the signal is amplitude expanded complementary to the compression function to restore its original amplitude distribution so as to obtain a correct signal for display. However since the luminance and chroma components have different amplitude distributions, a single companding law for either a composite signal or a MAC signal will not provide optimum noise reduction for both components.

It is therefore desirable to provide optimum companding for both luminance and chroma components of video signal.

SUMMARY OF THE INVENTION

Method and apparatus for transmitting luminance and chroma component signals of a color video signal, said method comprising amplitude compressing said component signals using different compression laws for said luminance component signal and for said chroma component signals.

DETAILED DESCRIPTION

Figure 1:
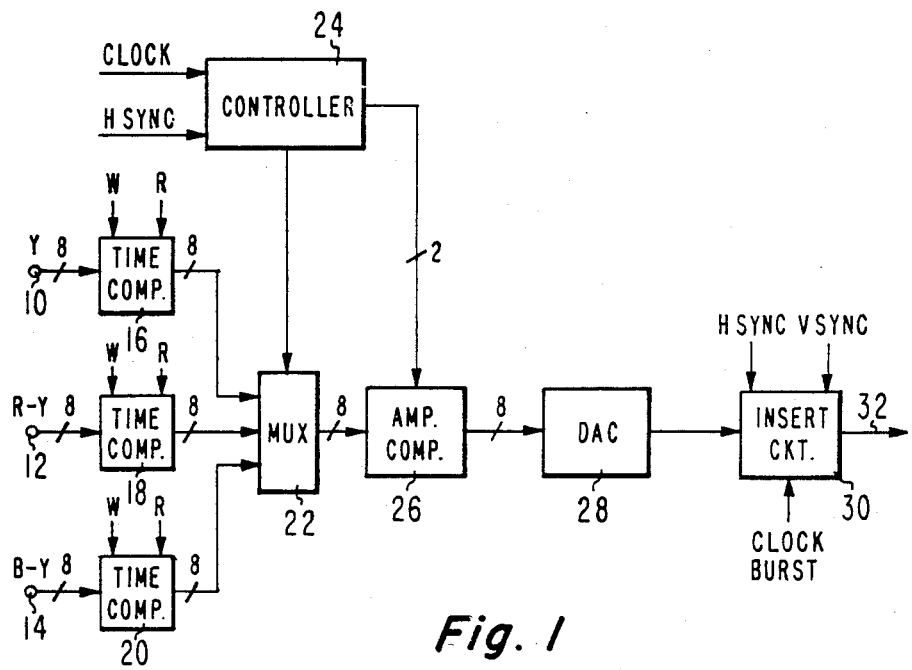
FIG. 1 is a block diagram of a transmitter in accordance with the present invention.

FIG. 1 shows a block diagram of a transmitter. Input terminals 10, 12, and 14 respectively receive Y, R-Y, and B-Y 8-bit digital video signals from a source, e.g. a camera followed by an 8-bit digitizer. For a satellite path, the Y signal might typically have a sample rate of $3f_{sc}$ (10.74 MHz for NTSC), while the R-Y and B-Y would be digitized at $f_{sc}$ (3.58 MHz). For a VTR, the digitized frequencies typically might be 13.5 MHz for Y and 6.75 MHz for R-Y and B-Y.

The Y, R-Y, and B-Y signals are respectively applied to time compressors 16, 18 and 20. As known in the art, each of compressors 16, 18, and 20 can comprise input and output switching circuits and a pair of RAMs (random access memories), a first of which has information written in during a line, while the second of which reads out information. During the next line, the first RAM is in the READ mode, while the second RAM is in WRITE mode, etc. The READ and WRITE clock signals are supplied by clock signal sources (not shown). The WRITE clock frequencies are equal to the digitizing frequency of the respective input signal, while the READ clock frequencies are higher than the respective WRITE frequencies in order to provide time compression. For satellites, the READ clock typically might be $4f_{sc}$ (14.32 MHz) for all compressors. This provides a time compression of 4:3 (14.32:10.74) for Y and 4:1 (14.32:3.58) for the R-Y and B-Y signals. For a VTR, the READ frequency typically might be 27 MHz, thereby providing a compression of 2:1 (27:13.5) for Y and 4:1 (27:6.75) for the R-Y and B-Y signals. The READ signals are synchronized during a line so that the output signals from compressors 16, 18, and 20 do not overlap in time.

The Y, R-Y, and B-Y signals are applied to MUX (multiplexer) 22, which is controlled by controller 24. As known in the art, controller 24 can comprise a counter that counts 27 MHz or 13.5 MHz clock pulses and is reset by the horizontal sync. A decoder is coupled to the counter to identify selected portions of the horizontal line time and to control MUX 22 in accordance with the time so as to couple each RAM to the following stages during the interval when the RAM is outputting signals. These signals can also control the timing of the READ signals applied to compressors 16, 18, and 20.

The 8-bit time multiplexed signal from MUX 22 is applied to amplitude compressor 26, which can comprise a 1K by 8 RAM or ROM (read only memory) whose address inputs are used as the signal inputs. The non-linear function is stored in the RAM as described in U.S. patent application Ser. No. 286,264, filed July 23, 1981, which issued Aug. 2, 1983, as U.S. Pat. No. 4,396,938 in the name of R. A. Dischert and assigned to the assignee of the present invention. In particular the $\mu$-law as used in telephony has been found useful in improving video signal-to-noise ratio. A possible $\mu$-law for the R-Y and B-Y signals is given by $$F(x) = 50 \pm 50 \frac{\log(1 + \mu x)}{\log(1 + \mu)}$$

wherein $$X = \frac{|\text{IRE UNITS} = 50|}{50}, \quad 5 < \mu < 10, \text{ has been found to be effective}$$

F(x) is the output signal in IRE units, and the positive sign, is used for input values equal to at least 50 units, and the negative sign is used for input values less than 50 IRE units. The absolute value sign is needed since the chroma signals are normally on a 50 IRE units pedestal. For the Y signals, the law can be $$F(x) = 100 \frac{\log(1 + \mu x)}{\log(1 + \mu)},$$

wherein $\mu$ equals about 3 and $$x = \frac{\text{IRE UNITS}}{100}.$$

Controller 24 supplies a 2-bit page control signal to compressor 26 to provide selection of one of four pages, each page having a different amplitude compression law. The four pages allow different laws for the R-Y and B-Y signals if that is found desirable due to different amplitude distributions between these signals. This would take up three pages for the three video signals. The fourth page can be used for compression of the audio signal, assuming it has been digitized, or compression of a digital coded signal. The fourth page can also have a linear transfer function if that is desired for a particular signal such as audio that has been compressed in analog form. This would require MUX 22 having an extra input. If the R-Y and B-Y signals are to have exactly the same compression law and no compression of audio or the code signal is to take place, then only a 1-bit page select signal is necessary to select between the two required pages to compress the two types of signals (Y and color difference).

The 8-bit output signal from compressor 26 is applied to DAC (digital-to-analog converter) 28. The resulting analog signal is applied to insertion circuit 30 which adds H and V sync and a clock burst signal, e.g. a signal that is frequency related by an integer to the 14.32 MHz or 27 MHz data rate frequency, such as respectively a 3.5 Hz or 4.5 MHz signal. The output of circuit 30 is applied to transmission channel 32, such as a satellite or VTR having an FM modulator (not shown).

Figure 2:
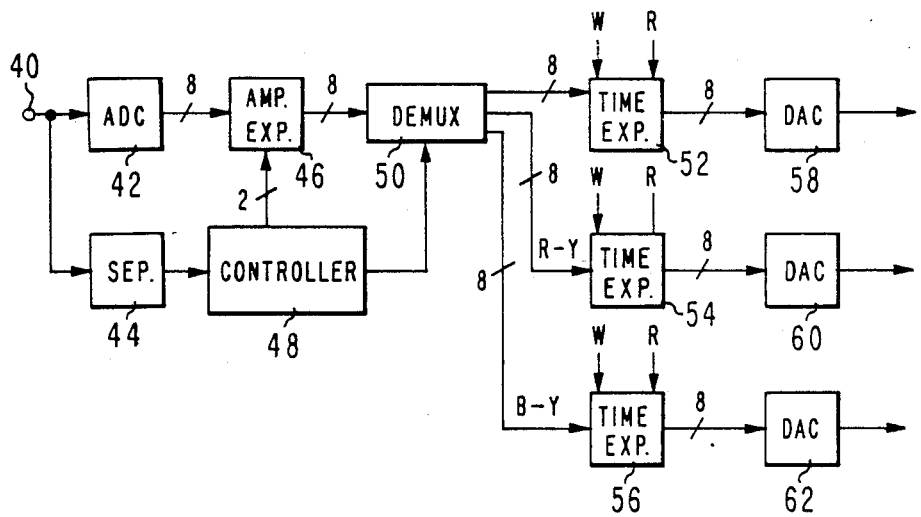
FIG. 2 is a block diagram of a receiver in accordance with the present invention.

FIG. 2 shows a block diagram of a receiver for use with the transmitter of FIG. 1. Input terminal 40 receives an analog video signal from channel 32 that has been demodulated by an FM detector (not shown). This baseband signal is applied to ADC (analog-to-digital converter) 42 and to separator circuit 44. The output signal of ADC 42 comprises an 8-bit time multiplexed digital video signal occurring at e.g. 14.32 MHz for a satellite path or 27 MHz for a VTR, which signal is applied to the address inputs of a RAM comprising amplitude expander 46.

The H and V sync and clock burst signals from separator 44 are applied to controller 48, which has a similar construction as controller 24. The clock signal can be obtained from a VCO (voltage controlled oscillator) frequency multiplier (not shown) within controller 48 by frequency comparing the clock burst with the VCO output signal that has been frequency divided. A 2-bit page select signal is applied to expander 46 to select the expanding function which is complementary to the compressing function used with the respective signal, e.g. inverse µ-law with the appropriate value of µ.

The amplitude expanded digital signals from expander 46 are then applied to DEMUX (demultiplexer) 50, which is controlled by controller 48. The separated Y, R-Y, and B-Y signals are respectively applied to time expanders 52, 54, and 56 which expanders can be of identical construction as time compressors 16, 18, 20, e.g. each comprising a pair of switched RAMs, one of which writes while the other reads during one line, the operations being interchanged during the next line.

The WRITE clock frequencies for all expanders 52, 54, and 56 can be derived from controller 48 and are the same and equal the video data rate, e.g. 14.32 MHz for satellite or 27 MHz for a VTR. The READ clock frequencies are selected to be lower so that time expansion takes place such that all signals occupy an entire active line. For the Y signal READ clock frequency, 10.74 MHz for a satellite path and 13.5 MHz for a VTR can be used. For the R-Y and B-Y signals the READ clock can be 3.58 MHz for a satellite path or 6.75 MHz for a VTR.

The 8-bit output signals from expanders 52, 54, and 56 are respectively applied to DACs 58, 60, and 62, where analog output signals are available for further processing, e.g. matrixing, or for display.

What is claimed is:

1. A method for transmitting luminance and chroma component signals of a color video signal and for reducing the effect of noise on the transmitted signals, said method comprising amplitude compressing said component signals using different compression laws for said luminance component signal and for said chroma component signals, and wherein:
    said compression law for said luminance component signal is a non-symmetrical function of the amplitude of said luminance component signal and wherein
    said compression law for said chrominance component signal is a symmetrical function of the amplitude of said chrominance component signal.

2. Apparatus for transmitting luminance and chroma component signals of a color video signal and for reducing the effect of noise on the transmitted signals, said apparatus comprising first means for amplitude compressing said component signals using different compression laws for said luminance component signal and for said chroma component signal and wherein;
    said compression law for said luminance component signal is a non-symmetrical function of the amplitude of said luminance component signal and wherein
    said compression law for said chrominance component signal is a symmetrical function of the amplitude of said chrominance component signal.

3. Apparatus as claimed in claim 2, further comprising second means for time compressing said luminance and chroma components; switch means for selectively coupling the time compressed components to the input of said first means and controller means coupled to said switch means and to said first means for controlling the compression law of said first means in accordance with the component selected by said switch means.

4. Apparatus as claimed in claim 2, wherein said chroma component signal comprises first and second color difference component signals and wherein said first means uses different compression laws for each of said color difference component signals, and wherein each compression law is a symmetrical function of the amplitude of respective ones of said color difference signals.

5. Apparatus for receiving amplitude compressed luminance and chroma components of a color video signal wherein said components are compressed prior to transmission by different compression laws for reducing the effect of noise on the transmitted signals, said apparatus comprising first means for expanding said components using different expansion laws that are the inverse of said respective compression laws;
    said expansion law for said luminance component being is a non-symmetrical function of the amplitude of said luminance component and wherein
    said expansion law for said chrominance component being is a symmetrical function of the amplitude of said chrominance component.

6. Apparatus as claimed in claim 5, wherein said component signals are also time compressed and transmitted in time division multiplex form, said apparatus further comprising switch means coupled to the output of said first means for demultiplexing said component signals subsequent to amplitude expansion by said first means, a separate second means coupled to said switch means for providing time expansion of respective ones of said demultiplexed component signals; and controller means coupled to said switch means and to said first means for controlling the expansion law of said first means with the component selected for demultiplexing by said switch means.

7. Apparatus as claimed in claim 5, wherein said chroma component comprises first and second color difference components, each having different amplitude compression laws, said first means having different expansion laws for each of said chroma components and wherein each color difference component expansion law is a symmetrical function of the amplitude of respective ones of said color difference components.

8. Apparatus for transmitting luminance and chroma components of a color video signal and for reducing the effect of noise on the transmitted signal, said apparatus comprising,
   time compression means for each of said components;
   multiplexing means coupled to said compression means;
   amplitude compression means coupled to said multiplexing means and having different compression laws for said luminance and chrominance components;
   digital-to-analog converters coupled to said amplitude compression means; and
   a transmission path coupled to said converter means; and wherein
   said compression law for said luminance component is a non-symmetrical function of the amplitude of said luminance component; and wherein
   said compression law for said chrominance component is a symmetrical function of the amplitude of said chrominance component.

9. A method for transmitting color television signals comprising at least a luminance and a chrominance component from a source of signals, comprising the steps of
   controllably time-compressing each line of luminance-representative video to produce time-compressed luminance signals;
   controllably time-compressing each line of chrominance-representative video to produce time-compressed chrominance signals;
   controlling said controllably time-compressing so that the sum of the duration of the time compressed luminance and chrominance-representative signals equals a predetermined duration and so that each of said time-compressed luminance and chrominance signal is generated time-sequentially;
   adding together said time-compressed luminance and chrominance signals to form a sequential time-multiplexed signal including luminance and chrominance signal positions in a time sequence;
   amplitude-compressing said sequential time-multiplexed signal according to a controllable law;
   controlling said law in accordance with said time sequence to form a plural-law-compressed signal; and
   transmitting said plural-law-compressed signal over a single transmission channel and wherein:
   said compression law for said luminance component is a non-symmetrical function of the amplitude of said luminance component and wherein
   said compression law for said chrominance component is a symmetrical function of the amplitude of said chrominance component.

* * * * *